Figure 1:
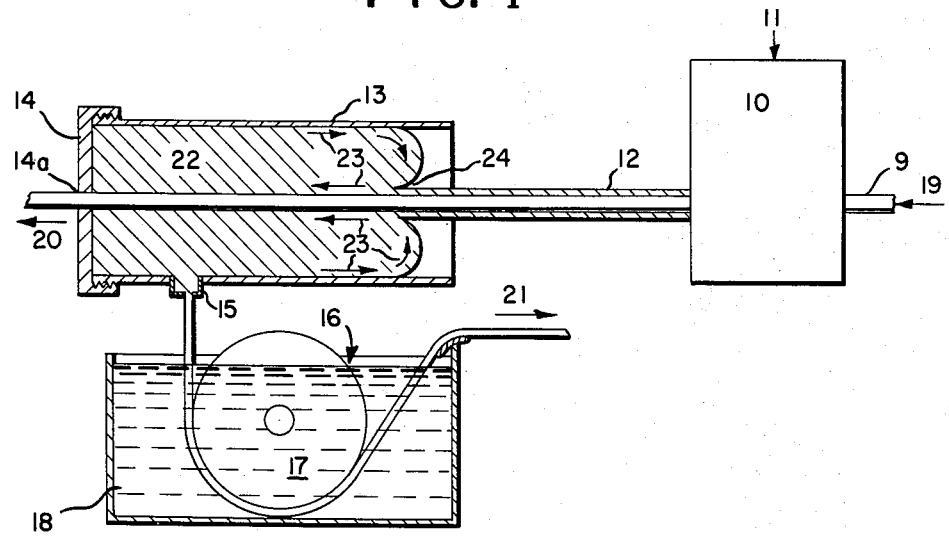

INVENTORS
REUBEN THOMAS FIELDS
ANGUS RUCKER BLAKEY, JR.

BY
ATTORNEY

Dec. 17, 1963    A. R. BLAKEY, JR., ETAL    3,114,170
EXTRUSION DEVICE

Filed Jan. 25, 1961    3 Sheets-Sheet 2

INVENTORS
REUBEN THOMAS FIELDS
ANGUS RUCKER BLAKEY, JR.

BY
ATTORNEY

INVENTORS
REUBEN THOMAS FIELDS
ANGUS RUCKER BLAKEY, JR.

BY Earl L. Tyner Jr.
ATTORNEY

United States Patent Office 3,114,170
Patented Dec. 17, 1963

3,114,170
EXTRUSION DEVICE
Angus Rucker Blakey, Jr., Kennett Square, Pa., and Reuben Thomas Fields, Wilmington, Del., assignors to E. I. du Pont de Nemours and Company, Wilmington, Del., a corporation of Delaware
Filed Jan. 25, 1961, Ser. No. 84,939
2 Claims. (Cl. 18—12)

This invention relates to a device for the extrusion of thermoplastics, and, more particularly, to an apparatus and technique for rapidly melting and extruding a thermoplastic of low bulk density and/or small particle size for subsequent cooling and cutting of the molten material into conventional molding powder.

Generally, extruders are utilized to compact, heat, melt, and mix thermoplastics of low bulk density prior to extruding same in a molten stream for subsequent cooling to form a solid strand and cutting the strand into conventional molding powders. In order to produce a steady, high-capacity flow from an extruder, a large amount of compaction must be effected therein when handling thermoplastics of low bulk density. In addition the additives, which are desired to be incorporated in the polymer, must pass through the same stages of working and heating as the molten thermoplastic which, in some cases, adversely affects the physical properties of the polymer and promotes degradation while the polymer is in the molten state. Although precision design may help to eliminate the above-mentioned difficulties, the scale-up of a laboratory size extruder is further complicated in that a change in the melt history, e.g., shear, residence time and temperature occurs in scaling up to conventional plant-size equipment further confounding the scale-up calculations.

It is an object of this invention to provide an apparatus and a technique for rapid melting, mixing, and extrusion of thermoplastic particles. Still another object of this invention is to provide an apparatus which will melt and extrude thermoplastics with a minimum of residence time of the material in the apparatus. A further object of this invention is to provide an apparatus which may be scaled-up from laboratory-size to plant-size equipment with no significant change in the melt history of the polymer. Still a further object of this invention is to provide simplified equipment which exhibits high power efficiency in melting thermoplastic material along with low maintenance cost and also provides an apparatus which may be easily changed from the processing of one type of thermoplastic composition to another. An additional object of this invention is to provide an apparatus which is uniquely adapted for melting a polymer having a small particle size and/or low bulk density and which may be easily adjusted to process a wide range of thermoplastic materials.

The above objects are accomplished by providing an apparatus for the continuous plastification of thermoplastic particles which comprises a means for directing the particles onto a moving surface which is heated to a temperature of at least the softening temperature of the particular particle directed thereupon. The particles adhere to the surface and begin softening practically instantaneously forming a plasticated film on the surface. When the film is substantially completely plasticated, it is removed from the surface by a suitable means and thereafter directed to a collection zone located adjacent to the point of removal which acts as a holdup reservoir and permits the drag flow of the plastic film to induce pressure therein. The time of holdup in the collecting zone or reservoir is of momentary duration. At least one passageway is provided which connects the collecting zone or reservoir with a zone maintained at a pressure less than that in the reservoir. This arrangement permits controlled discharge of the pressurized thermoplastic in the reservoir and permits subsequent treatment of the extruded material, i.e., cooling and cutting into standard molding granules. A suitable means located adjacent to the heated surface may be provided to press the thermoplastic particles towards the surface and into the plasticated film thereby assuring substantially complete softening of all the particles directed onto the surface. Suitable additives may also be introduced in the fluff prior to directing same upon the heated wheel or into the collecting zone. In the former case, the high rate of shear results in substantially instantaneous mixing of the additives with the plasticated thermoplastic.

Figure 5:
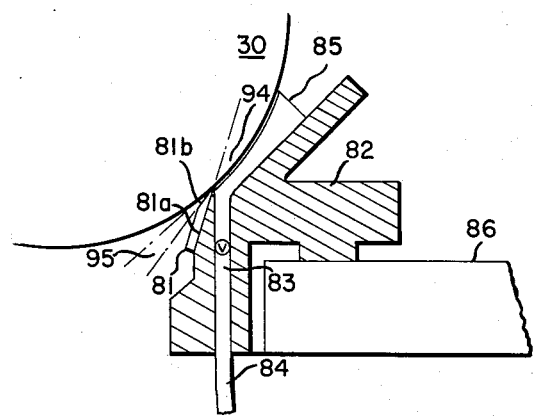
Figure 2:
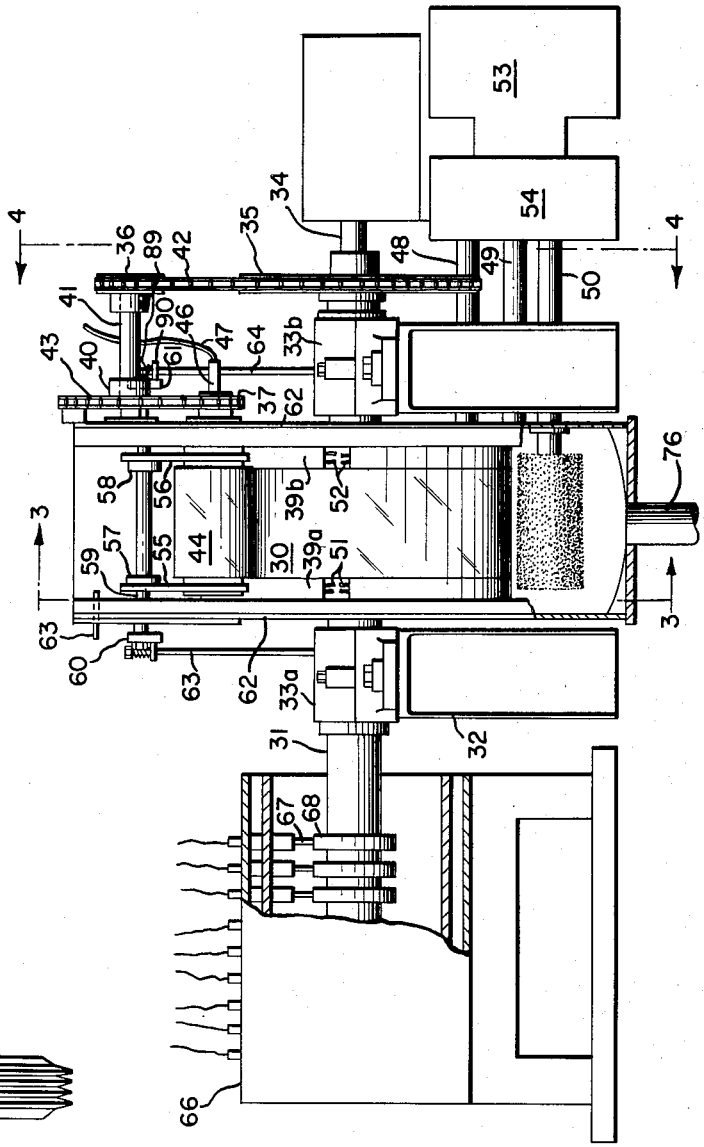
Figure 3:
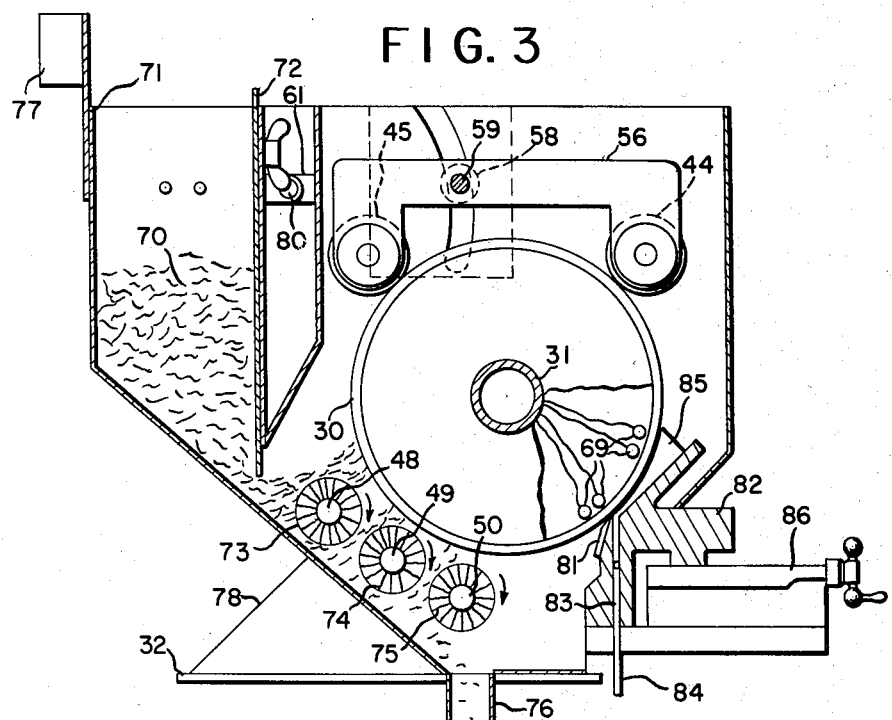
Figure 4:
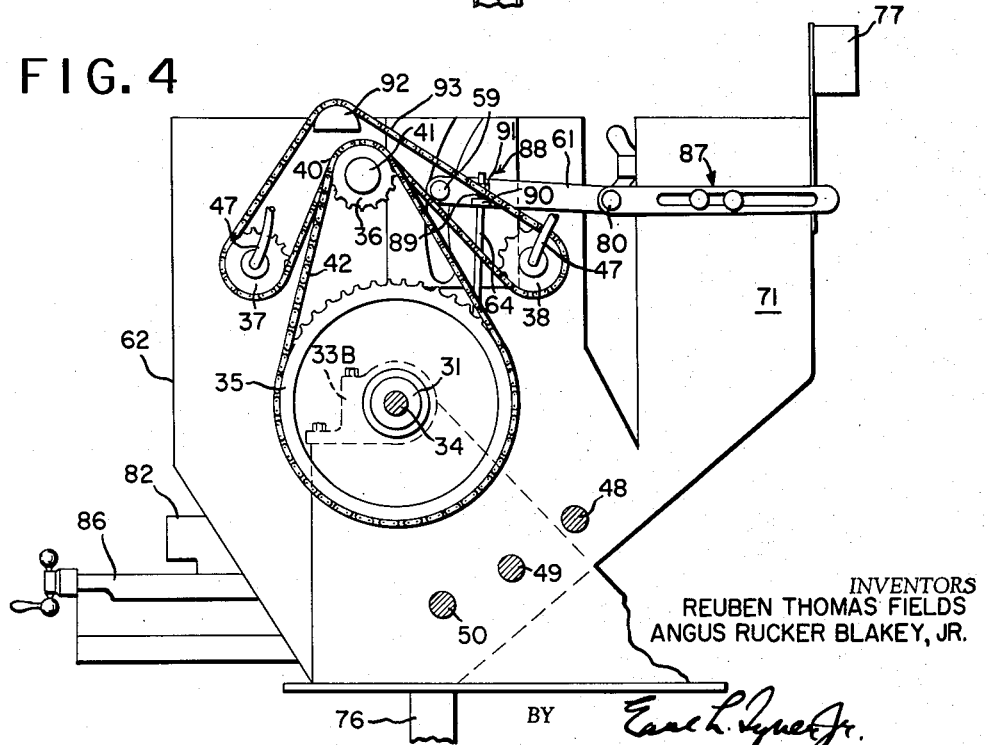

A more complete understanding of the technique and apparatus of the present invention may be had by referring to the drawing attached hereto and made a part of this specification in which FIGURE 1 is a schematic view of a simplified apparatus employing the technique of the present invention, FIGURE 2 is a front view of an apparatus capable of high rates of plastication embodying the technique of the present invention, FIGURE 3 is a side view of the apparatus of FIGURE 2 with the driving means and the side supporting plate removed for easier viewing of the internal mechanism, FIGURE 4 is a side view along the line 4—4 of FIGURE 2 showing the driving means of the apparatus employing the technique of the present invention, FIGURE 5 is an enlarged cross section of the removal knife, metering zone and die arrangement of the apparatus of FIGURES 2, 3, and 4, and FIGURE 6 illustrates an alternate design for the melting wheel shown in the apparatus in FIGURES 2–5. FIGURE 1 shows a simplified form of the apparatus of the present invention wherein a wire 9 of circular cross section which has been heated to the softening point of the given polymer is passed through a suitable device 10 which distributes the polymer fluff stream 11 upon the wire 9. A hollow rotating cylinder is entirely suitable for this operation, or it is possible to replace the device shown as item 10 with a trough or other reservoir that is filled with polymer fluff and into which the wire is passed to permit the fluff to adhere to the outer surface of the wire. As the wire 9 emerges from the coating device 10, it is covered with a coating of polymer 12 which is softened by virtue of the heat in the wire. A reservoir 13 is positioned downstream of the coating device, and in the present illustration is shown as a hollow cylinder enclosed at one end with a suitable cap 14 having a hole 14a centrally located therein closely corresponding to the cross sectional area and configuration of the wire 9. A passageway 15 is located at the bottom of the reservoir 13 and provides an opening for discharge of the molten polymer which subsequently is directed to a suitable cooling apparatus 16 in this case illustrated as a wheel 17 and water bath 18. The wheel 17 operates to permit the direction of the strand to be changed for convenience of operation. The direction of movement of the wire 9 by arrows 19 and 20 and the direction of the strand is shown by arrow 21. As the wire 9 is drawn through the opening 14a in cap 14, the coating 12 is stripped from the wire and begins to fill the reservoir moving towards the open end of the reservoir 13. When the reservoir becomes sufficiently full, the drag flow of the wire passing therethrough will restrain the melt from further movement towards the open end of the reservoir. The general direction of flow within the reservoir caused by the drag flow is shown by arrows 23. In addition to restraining the polymer within the reservoir 13, the drag flow will tend to build up a substantial pressure therein and force the molten polymer 22 through the die opening 15 in the form of a strand, or, if desired, a multiple die producing a series of strands. The strand or strands may then be cooled directly, drawn and cooled, or melt cut depending upon the desired product. In most instances, the molten strand emanating from the die 15 is cooled to a solid state and thereafter cut in the form of conventional molding powder. Additives may be blended in the polymer stream 11 or may be added directly to the melt at location 24. In the former, and preferred technique, the drag flow and turbulence within the reservoir 13 will thoroughly disperse the additive throughout the melt. The velocity of the wire passing through the polymer distributor 10 and reservoir is not a critical consideration in the present invention, however, it has been determined that the most convenient operating velocity for the wire is in the range of from 100 to 500 ft./sec. A negligible advantage is realized by increasing the speed of the wire above 500 ft./sec. since it appears to be difficult to force the polymer to adhere to a surface moving faster than about 500 ft./sec.

FIGURE 2 shows a front view of a commercial apparatus embodying the features of this invention with the removal or scraper knife and extrusion die omitted for easier viewing. The heated moving surface is a drum 30 mounted upon a hollow shaft 31 which is supported upon the frame of the machine 32 via the bearings 33a and 33b. A driving means such as a motor with suitable reducing gears is attached to the hollow shaft 31 at location 34. A large sprocket gear 35 is attached to shaft 31 to drive a smaller sprocket gear 36 attached to shaft 41 which in turn rotates gear 40 and gears 37 and 38 (not shown). Thus, as the large sprocket gear 35 rotates gear 36 by virtue of chain 42, the chain 43 which connects the roller driving sprockets 37 and 38 and the transfer gear 40 is rotated at a speed determined by the relative size of the sprocket gears. The roller driving gear 37 is attached to shaft 46 which, in turn, is attached to drum 44 and rotates that drum at the same surface speed as the surface speed of the main drum 30. Cooling fluid is supplied through shaft 46 via line 47 to control the temperature of the external surface of the drum 44 thereby preventing adhesion of polymer thereto during the operation of the melter. The drum or cylinder 44 is in continuous contact with the molten film of polymer on drum 30 and presses any solids present in the molten film against the drum and provides a homogeneous melt for subsequent removal by the scraper knife. A drum similar to the one shown at 44 is provided on the same horizontal plane and in the rear of the apparatus with similar driving gears and temperature control means as above-described for drum 44 and performs the same function as that drum. A bearing comprising two cylindrical strips 39a and 39b of polytetrafluoroethylene, the temperature of which is controlled by coils 51 and 52 is provided to permit drum 30 to operate for extended periods of time with no severe abrasion to the sides and frame of the apparatus. Variable speed drive shafts 48, 49, and 50 are provided to propel brushes (one shown in this drawing) which direct the polymer onto the surface of the heated drum 30. These shafts are driven by motor 53 and gear box 54. Roll 44 and the identical roll 45 on the opposite side of the apparatus are supported by two U-brackets 55 and 56 which are attached to the shaft 59 at points 57 and 58 respectively. Shaft 59, in turn, is supported by adjustable arms 60 and 61 which are movably attached to the cover of the machine 62. Spring-loaded arms 63 and 64 are provided to maintain drums 44 and 45 in contact with drum 30. In normal operation, the device is provided with a cover for the top and front of the closure (similar to cover 62) but these covers are removed in this figure for easier viewing. An inlet 63 is provided to permit the entire inner volume of the cover adjacent to the rollers to be bathed in an inert gas when the top and front covers are attached to the apparatus to reduce oxidative and/or accompanying thermal degradation of the polymer being plasticated upon the heated drum 30. The feed hopper which supplies the polymer to the rotating brushes driven by shafts 48, 49, and 50 is not shown on this diagram but may be seen in FIGURE 3. The drum 30 is electrically heated by placing elements therein which serve to evenly distribute the heat over the entire external surface of the drum. Electrical power is supplied to these heating elements in the drum by a standard slip-ring system which comprises the slip-ring housing 66, the brushes 67 and the slip-rings 68. Each slip-ring 68 is connected to one or more heating elements within the drum 30. An outlet is provided in the base of the frame 62 to remove particles of polymer which fail to adhere to the heated wheel 30. Chute 76 is provided to direct the flow of these large particles to a suitable receptacle.

FIGURE 3 is a side view of the internal parts of the apparatus taken along the line 3—3 of FIGURE 2 with the scraper knife and adjustable die added to this view. Polymer 70 is introduced into the feed hopper 71 at the upper portion thereof and flows by gravity through gate 72 which is adjusted to control the rate of admission of the polymer to the rotating brushes 73, 74, 75 which are attached respectively to shafts 48, 49, and 50. The brushes act to mechanically fluidize the polymer passing thereover and direct same against the rotating drum 30 whereupon the polymer adheres to the drum. Other means are operable to direct the polymer onto the drum surface, e.g., paddle wheels and gaseous fluidization of the polymer. A portion of the drum is cut-away to show the location of heating elements 69 to which power is supplied by the slip-ring arrangement described in FIGURE 2. The speed of the brushes 73, 74, and 75 is regulated to provide a smooth, even film of polymer upon the heated drum. Particles which do not adhere to the wheel pass through the base and thence through chute 76 to a suitable receptacle for reprocessing or destruction. A vibrating means 77 may be attached to the feed hopper 71 to assure that polymer will flow evenly through the adjustable gate 72 and also serve to prevent bridging of the polymer within the feed hopper 71 and subsequent loss of feed to the revolving brushes. Brackets, such as the one shown at 78, are fixedly attached to the feed hopper 71 and the base of the machine 32 to support the vibrator, the feed hopper, and other parts of this machine. The temperature controlled rolls 44 and 45 which are mounted on U-bracket 56 (and also on U-bracket 55 not shown) at location 58 may also be seen. The entire U-bracket is pivoted upon shaft 59 which in turn is connected to flexible arm 61. Arm 61 is pivoted at point 80 and the rolls 44 and 45 are forced toward drum 30 by a suitable spring load at, or near, shaft 59. The means for removing the plasticized polymer film from the drum 30 is also shown in this drawing. The removal means comprises a scraper knife 81 attached to a die body 82 which in turn contains a passageway 83 for the polymer that is removed by the scraper knife 81 and which emerges as strand 84 which may be cooled and cut as described in FIGURE 1. A suitable shield 85, which conforms to the curved surface of wheel 30, attached to the die body 82, is provided to prevent the film from flowing out of contact with the drum 30 and to direct the film towards the scraper knife 81. The die assembly is attached to an adjustable clamp 86, such as that commonly used on lathes and permits regulation of clearance of the scraping knife 81 with the drum 30.

FIGURE 4 is a side view of the apparatus along the line 4—4 of FIGURE 2 showing the driving means for the rollers and the brushes. One of the adjustable arms which support the shaft 59 which in turn is attached to the U-brackets 55 and 56 (not shown on this drawing) may be seen. The arm is pivoted at point 80 and attached to the machine at location 87. The pivoted portion of the arm 61 is spring loaded to force the arm and the rollers attached thereto towards the drum 30. The spring load comprises shaft 64 which is threaded on its upper portion 88 and over which a spring 89 is placed and is forced towards the bracket 90 which is attached to arm 61. The base of the shaft 64 is fixedly attached to the frame of the machine. As the bolt 91 is turned onto shaft 64, the spring 89 is compressed and forces the arm 61 downwardly. The vibrating means 77, the feed hopper 71, the adjustable clamp 86 and a portion of the die assembly and overflow chute 67 are visible on this drawing. The large sprocket gear 35 is fixedly attached to shaft 31 which in turn is rotated by a suitable driving means (not shown). The sprocket 35 drives gear 36 via chain 42 and gear 40 which is fixedly attached to shaft 41 as is sprocket gear 36. The sprocket gear 40 is arranged to drive gears 37 and 38 which are attached to rolls 44 and 45 respectively. A suitable device, such as the surface 92, is provided to maintain the proper tension in chain 93.

FIGURE 5 shows an enlarged view of the die assembly in cross-section comprising scraping knife 81, the die body 82 and the collecting zone and passageway 83. The die body is provided with a partition 85 to direct the flow of melt towards the scraper knife 81 and to prevent escape of the molten material from the sides of the cylinder, and is fixedly attached to the rearward portion of the die body 82. The entire die may be heated by a suitable means such as a strip heater, or bayonet heater inserted in, or attached to, the body of the die. Polymer is removed from the surface of drum 30 by knife 81 and passes through channel 83 whence it emerges as strand 84. The entrance angle 94 of the knife and the relief angle 95 of the knife are important considerations in the design of the present apparatus. The entrance angle is defined as the angle formed by a line extending parallel to the lower edge 81a of the scraping knife and a line tangent to the drum 30 at the point of contact of the knife and lies between 20° and 45° and preferably about 30°. The relief angle 95 is also important in the design of the instant apparatus and is defined as the angle between a line tangent to the drum 30 at the point of contact of the knife 81 and a line parallel to the upper face or wedge portion of 81b of the doctor knife 81. The relief angle should be greater than about 5° and preferably between 15° and 40° but always less than the entrance angle. Suitable materials of construction for the die body 82 include mild or stainless steel, and suitable materials of construction of the scraper knife 81 include bronze and steel.

Figure 6:
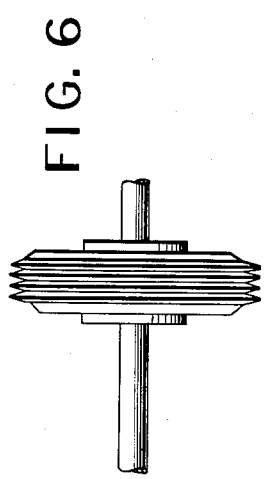

FIGURE 6 shows an alternate design for heating the drum shown as 30 on FIGURES 2–5 wherein a serrated or disc wheel is employed. This wheel provides larger surface area for a given width as compared to the wheel above described, but is somewhat more difficult to construct and to operate due to the intricate design of the scraping knife which must be employed to remove the polymer from this heated drum. This modification is considered within the purview of the invention as will other designs that are apparent to one skilled in the art in view of the teachings hereinabove.

The following example is given to illustrate the typical operation of the apparatus of the present invention and, although the polymer employed in this instance was fluffy polyoxymethylene diacetate, it is understood that this apparatus may be employed to process any type of thermoplastic polymer having low bulk density and/or small particle size. Reference is made throughout this example to the numbered parts which appear in the above-described drawings. Water at substantially room temperature is introduced to cooling rolls 44 and 45 and to the plastic lining strips 39a and 39b through tubes 51 and 52 embedded therein. The adjustable gate 72 is set to close the feed hopper 71 (no polymer passage to the brushes), and polymer is intorduced therein. In this example, the polymer is fluffy polyoxymethylene diacetate having a bulk density of about 0.2–0.5 gram/cc. The power supply to the slip-ring 67 and 68 is set by means of temperature controllers to maintain a temperature on the surface of drum 30 of about 200° C. to 210° C. and the heating means within the die body 82 is adjusted to maintain the die at approximately 188° C. to 205° C. When the drum and die body have reached the required temperature the doctor knife 81 is adjusted by means of the movable plate 86 to maintain a clearance between the knife and the drum of approximately 0.001–0.002 inch. After the doctor knife is adjusted, nitrogen is introduced via port 63 to bathe the inner surface on the apparatus in the inert gas. The rotation of the drum 30 is commenced at about 10–20 r.p.m. and the feed gate 72 is opened to emit about 5–10 lbs./hr. of fluff to the brushes 73, 74, and 75 which are rotating at a speed of about 100 r.p.m. As the polymer fluff begins to strike the cylinder 30, the rotational speed thereof is increased to about 40–60 r.p.m. and the feed gate was then adjusted to provide fluff at the rate of about 30 lbs./hr. As the molten materail was delivered to doctor knife 81, the scraping efficiency of the knife was noted and any further adjustments necessary were made. When the molten polymer entered passageway 83, the valve located on the discharge end thereof was adjusted to obtain a back pressure in the die of about 50 to 600 p.s.i. to assure sufficient working of the melt. When steady conditions were obtained by the above adjustments, a cover was placed on the machine along the upper horizontal and forward vertical faces and the strands 84 emerging from the die were passed through the cooling means and thence to a suitable cutter. In this example, a steady extrusion rate of 20 lbs./hr. was obtained with the settings as described above, and the amount of polymer passing through chute 76 was judged to be approximately 10 lbs./hr. In subsequent runs it was determined that the amount of materials passing through chute 76 could be markedly reduced to the point where it amounted to only a small percentage of the material fed to the melter. In additional runs, the same polymer employed in the above described example was dry blended with titanium dioxide, carbon black, and other pigments and was thereafter passed through the melter and the extrudate examined to determine the dispersion and mixing efficiency of the machine. All additives were very well dispersed throughout the polymer indicating extremely satisfactory mixing within the present machine. When the molding powder prepared from comparable polymer by extrusion was compared to the present material, it was noted that, in all cases, the additives in the plastic processed through the machine of the present invention were more finely and thoroughly dispersed in the polymer. Other thermoplastics which are operable in the apparatus in the present invention include, but are not limited to, polyamides, acrylic resins, polyvinyl chloride, polyvinyl fluoride, copolymers of tetrafluoroethylene and hexafluoropropylene, olefin polymers, such as polyethylene and polypropylene etc., and olefin copolymers.

The apparatus of the present invention finds application in most thermoplastic processing where the solid materials may be melted, extruded, quenched and cut into conventional molding powder with a minimum of residence time at high temperatures. The present device is capable of melting small particles of polymer in about one second by conduction of heat therethrough resulting in less thermal degradation of the particular thermoplastic being processed. In addition, the apparatus of the present invention, even with the short residence time required for complete melting, extruding and solidification offers extremely efficient mixing. The difficulties encountered in the scale-up of conventional extruders are eliminated in the present device since the width of the heated surface may be increased without change in the melt history of th polymer being processed.

We claim:

1. An apparatus for the continuous plastification of thermoplastic particles which comprises a means for directing thermoplastic particles onto a moving surface, a means for heating said surface to a temperature of at least the softening temperature of said particles causing said particles to adhere to said surface and forming a plasticated film thereupon, a means to remove said film from said surface, a collecting zone located adjacent to said removal means to receive said thermoplastic film and restrict the flow thereof, thereby causing an increase in pressure in said plasticated material and at least one passageway connecting the portion of said collecting zone wherein the pressurized plasticated thermoplastic resides with a discharge zone at a pressure less than that in said collecting zone to provide a means for controlled discharge of the pressurized thermoplastic from said collecting zone.

2. An apparatus for the continuous melting and extrusion of thermoplastic particles which comprises a means for directing said particles onto a moving surface, a means for heating said surface to a temperature of at least the melting temperature of said particles causing said particles to adhere to said surface and forming a plasticated film thereupon, a means to compress said particles upon said heated surface, a means to remove said film from said surface, a collecting zone located adjacent to said removal means to receive said plasticated film and restrict the flow thereof, thereby causing an increase in pressure in said plasticated material by virtue of drag flow and at least one passageway connecting the portion of said collecting zone wherein said pressurized thermoplastic resides with a discharge zone at a pressure less than that in said collecting zone to provide a means for controlled discharge of the molten pressurized thermoplastic in said retaining zone.

References Cited in the file of this patent

UNITED STATES PATENTS

| 2,052,005 | Root | Aug. 25, 1936 |
| 2,645,813 | Swallow | July 21, 1953 |
| 2,718,989 | Day et al. | Sept. 27, 1955 |
| 2,754,543 | Loew | July 17, 1956 |
| 2,845,656 | Gabbrielli | Aug. 5, 1958 |

FOREIGN PATENTS

| 859,959 | Great Britain | Jan. 25, 1961 |